Feb. 15, 1927.
S. W. LOMBARD
1,617,717
CLUTCH
Filed March 18, 1926    2 Sheets-Sheet 2
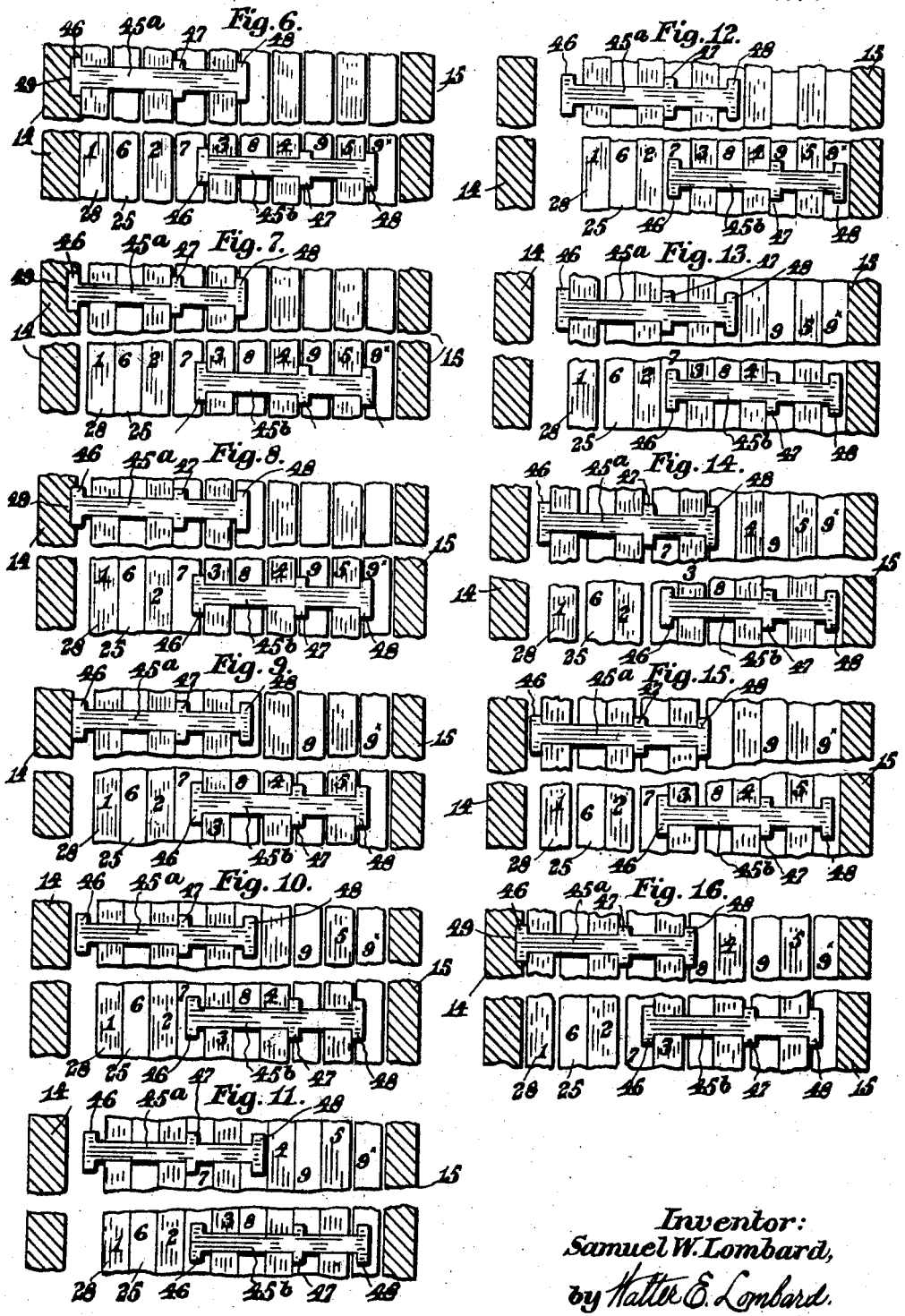
Inventor:
Samuel W. Lombard,
by Walter E. Lombard.
Atty.

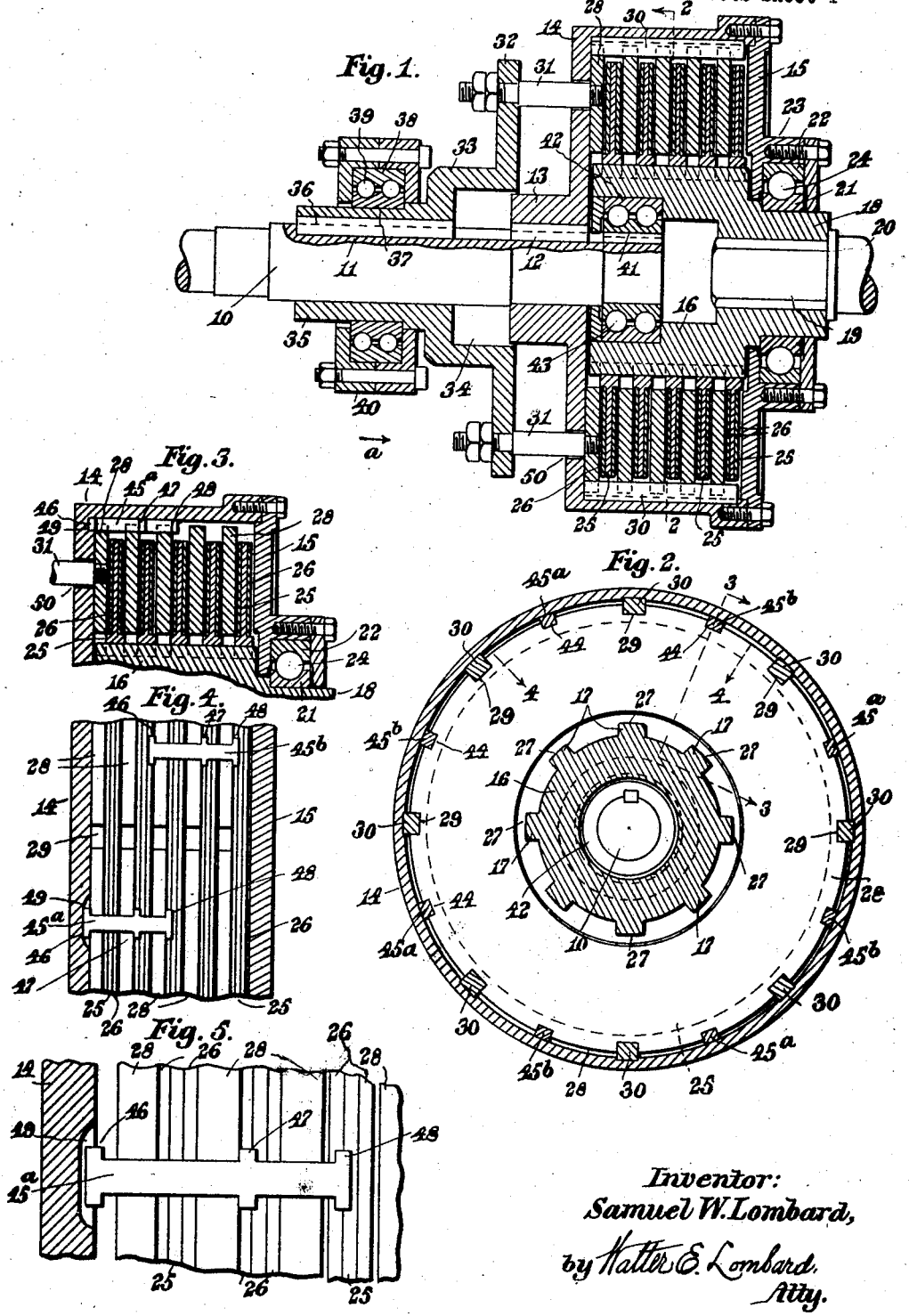

Patented Feb. 15, 1927.

1,617,717

UNITED STATES PATENT OFFICE.

SAMUEL W. LOMBARD, OF WATERVILLE, MAINE, ASSIGNOR TO LOMBARD TRACTION ENGINE CO., OF WATERVILLE, MAINE, A CORPORATION OF MAINE.

CLUTCH.

Application filed March 18, 1926. Serial No. 95,797.

This invention relates to clutches and has for its object the production of a device of this character in which rotary movement may be imparted to a driven member through a plurality of friction disks which are adapted to be forced successively into and out of commission.

This object is attained by the mechanism illustrated in the accompanying drawings.

For the purpose of illustrating the invention, one preferred form thereof is illustrated in the drawings, this form having been found to give satisfactory and reliable results, although it is to be understood that the various instrumentalities of which the invention consists can be variously arranged and organized, and the invention is not limited to the precise arrangement and organizition of these instrumentalities as herein shown and described except as required by the scope of the appended claims.

Of the drawings—

Figure 1 represents a vertical longitudinal section of a clutch embodying the principles of the present invention.

Figure 2 represents a transverse section of same on line 2, 2, on Fig. 1.

Figure 3 represents a section on line 3, 3, on Fig. 2.

Figure 4 represents a section on line 4, 4 on Fig. 2 showing the various friction disks in neutral position.

Figure 5 represents a section detail drawn to an enlarged scale showing two of the metal disks and two of the friction disks in commission, and Figures 6 to 16 inclusive represent in diagram the positions of the various disks and connectors when the disks are being forced into and out of commission.

Similar characters indicate like parts throughout the several figures of the drawings.

In the drawings, 10 is a driving shaft having a key way 11 therein in which is disposed a key 12 secured in the hub 13 of a casing 14, the opposite end of which is closed by a plate 15.

Disposed within the casing 14 is a block 16 having a plurality of radial ribs 17 formed on and extending lengthwise of the periphery thereof.

The block 16 has a hub 18 extending therefrom and in this hub is disposed the flat-sided end portion 19 of a driven shaft 20.

On the hub 18 is a grooved collar 21 between which and a collar 22 disposed in the hub 23 of the cover plate 15 are a plurality of anti-friction members 24.

Mounted upon the block 16 are a plurality of friction disks 25, the opposite faces having facings 26 of suitable friction material.

These disks 25 have slots 27 in their inner cylindrical wall which fit over the ribs 17 of the block 16.

By means of this construction the friction disks 25 rotate with the block 16 but are freely slidable lengthwise thereof.

At one side of each friction disk 25 is a metal disk 28 which has a plurality of peripheral slots 29 therein, in each of which is disposed a key 30 set into the inner cylindrical wall of the casing 14.

The metal disks 28 have a diameter greater than that of the friction disks 25 so that the keys 30 lie in a cylindrical plane outside of the peripheries of the disks 25 thus permitting the rotation of the disks 25.

By means of this construction the metal disks are rotated with the casing 14 but are slidable lengthwise thereof.

The outer metal disk 28 has secured thereto a plurality of rods 31, the opposite ends of which extend through a plate 32 having a hub 33 in which is a recess 34 into which the hub 13 of the casing 14 projects.

A reduced end 35 of the hub 35 has a key 36 therein extending into the key way 11 of the driving shaft 10, said key 36 and hub 33 being reciprocable lengthwise of the driving shaft 10.

On this reduced end 35 is disposed a grooved collar 37 between which and a collar 38 are disposed a plurality of anti-friction members 39.

The collar 37 is driven onto the reduced end 35 and is immovable relatively thereto.

The collar 38 is positioned within a shifting member 40 which may be of any well known construction.

This shifting member 40 may be of any usual construction and therefore its illustration in detail is deemed unnecessary.

The key way 11 in the shaft 10 also has disposed therein a key 41 between which and a grooved collar 42 disposed in the inner end of the block 16 are a plurality of anti-friction members 43.

Intermediate the peripheral slots 29 in the metal disks 28 are a plurality of notches 44, these notches being provided to receive a plurality of connectors 45ª and 45ᵇ.

These connectors 45ª, 45ᵇ have oppositely disposed projections 46, 47 and 48 thereon.

When the metal disks 28 are free from contact with the friction disks 25, the projections 46 on the connectors 45ª are disposed in recesses 49 in the end wall of casing 14 as shown in Fig. 4 of the drawings.

The projections 46 of the other series are in contact with one face of the central metal disk 28 as shown in the upper part of Fig. 4 of the drawings.

When thus positioned the projections 47 and 48 of each series are in contact with the opposite faces of two of the other metal disks 28 as shown in said Fig. 4.

When the shifter 40 is moved in the direction of the arrow $a$ on Fig. 1 of the drawings, the plate 32 will be moved toward the casing 14 and through the rods 31 extending through openings 50 in the end wall of the casing 14, the outer metal disk 28 will be moved into contact with the friction disk 25 adjacent thereto.

To make the operation of these connectors clearer a plurality of diagrams, Figs. 6 to 16 are shown in the drawings. In order to simplify the description the metal disks 28 are numbered 1 to 5 inclusive and the friction disks 6 to 9ˣ inclusive.

In Fig. 6, both series of connectors 45ª and 45ᵇ are in their normal position with all of the metal disks 28 free from contact with the friction disks 25.

In Fig. 7, is shown the position of these connectors when the outer metal disk 1 has moved into contact with the first friction disk 6 and forced this friction disk 6 into contact with the second metal disk 2. It will be noted that during this movement neither of the connectors 45ª and 45ᵇ have been moved.

In Fig. 8, the metal disks 1 and 2, and friction disk 6, have been moved sufficiently to bring the metal disk 2 into contact with the friction disk 7 with the friction disk 6 disposed between the metal disks 1 and 2. This movement of the disk 2 has caused the connector 45ª to be moved endwise so that the projections 48 thereon are free from contact with the metal disk 3. In this position the connector 45ᵇ has not been moved.

In Fig. 9 the metal disks 1, 2 and 3 and the friction disks 6, 7 and 8 are all in contact and the connector 45ª has been moved further forward so that the projection 48 of said connector is a greater distance from the disk 3 than it was in Fig. 8. The connector 45ᵇ in this view is still idle.

In Fig. 10 the metal disks 1, 2, 3, 4, and friction disks 6, 7, 8 are all in contact and the disk 4 has come into contact with the projection 47 on connector 45ᵇ preparatory to moving this connector 45ᵇ when the disks 1, 2, 3, 4, 6, 7, 8 are further advanced. In this position the projections 48 of connector 45ª are the same distance from the disks 3 as in Fig. 9.

In Fig. 11 the metal disks 1, 2, 3, 4 and 5, and the intermediate friction disks 6, 7, 8 and 9 are all in contact, with the projections 46, 47 and 48 of connector 45ª in the same relation to metal disks 1, 2 and 3 as is shown in Fig. 10. In this position the connector 45ᵇ has been advanced so that its projections 48 are separated from the metal disk 5.

In Fig. 12 all of the metal disks and friction disks are in contact and friction disk 9ˣ is also in contact with the cover plate 15. In assuming the position shown in Fig. 12 the connector 45ᵇ has been further advanced with its projection 48 further from metal disk 5 than in the position shown in Fig. 11. The clutch is now in commission with the driving shaft 10 imparting rotary motion to the shaft 20 and will remain in commission as long as the disks are retained in contact either manually or by any suitable spring.

After a clutch has been in use some time it is at times difficult to break the connection between the various disks, but this difficulty is entirely overcome by the construction shown and described herein.

As soon as metal disk 1 is moved in the opposite direction, or to the left of Fig. 13, it will come into contact with the projections 46 as shown in this view, thus separating positively the metal disk 1 from friction disk 6. No movement has as yet been imparted to connector 45ᵇ.

It will be noted that the projection 47 of connector 45ª has been brought into contact with metal disk 2 and continued rearward movement will cause the metal disk 2 to be separated from friction disk 7 and the metal disk 3 from friction disk 8 as shown in Fig. 14.

During this movement the metal disk 3 has been brought nearer to the projection 46 on connector 45ᵇ.

Further rearward movement will bring metal disk 3 into contact with the projection 46 on connector 45ᵇ ready in the next rearward movement to impart rearward movement to the connector 45ᵇ. This is the position shown in Fig. 15.

In Fig. 16 is shown the completion of the final movement of connector 45ᵇ, the projection 47 thereon having separated the metal disk 4 from friction disk 9 and metal disk 5 from friction disk 9ˣ.

In the continued rotation of the driving shaft the friction disks will disconnect themselves from the metal disks and assume the positions shown in Fig. 6, this being due to the fact that there is no pressure on the disks and that they are free to move endwise of the block 16.

This makes a very simple but effective friction clutch in which the various disks are adapted to be successively brought into contact when it is desired to rotate the shaft 20.

By such a construction as is herein shown the contacts between the various disks are broken successively but positively giving no opportunity for the disks to become "frozen" and prevent the proper operation of the clutch.

From the foregoing description it is believed that the operation and many advantages of the invention will be fully understood.

Having thus described my invention, I claim—

1. A clutch casing; a driving shaft to which said casing is fixedly secured; a driven shaft; a block secured thereto and restrained from end movement within said casing; friction disks rotatable with and slidable lengthwise of said block; a metal disk at one side of each friction disk rotatable with and slidable lengthwise of said casing; and means for positively and successively forcing said metal disks both into and out of contact with said friction disks.

2. A clutch casing; a driving shaft to which said casing is fixedly secured; a driven shaft; a block secured thereto and restrained from end movement within said casing; friction disks rotatable with and slidable lengthwise of said block; a metal disk at one side of each friction disk rotatable with and slidable lengthwise of said casing; and means movable endwise of said driving shaft outside of said casing for forcing said metal disks successively both into and out of contact with said friction disks.

3. A clutch casing; a driving shaft to which said casing is fixedly secured; a driven shaft; a block secured thereto and restrained from end movement within said casing; friction disks rotatable with and slidable lengthwise of said block; a metal disk at one side of each friction disk rotatable with and slidable lengthwise of said casing; means outside of said casing and connected to one of said metal disks for imparting reciprocatory motion thereto; and a plurality of connectors provided with projections adapted to engage the various metal disks and positively move them in either direction.

4. A clutch casing; a driving shaft to which said casing is fixedly secured; a driven shaft; a block secured thereto and restrained from end movement within said casing; friction disks rotatable with and slidable lengthwise of said block; a metal disk at one side of each friction disk rotatable with and slidable lengthwise of said casing; means outside of said casing and connected to one of said metal disks for imparting reciprocatory motion thereto; and a plurality of connectors disposed in peripheral notches in said metal disks and movable relatively thereto, said connectors having projections adapted to successively engage the metal disks in the movement of said connectors in either direction.

5. A clutch casing; a driving shaft to which said casing is fixedly secured; a driven shaft; a block secured thereto and restrained from end movement within said casing; friction disks rotatable with and slidable lengthwise of said block; a metal disk at one side of each friction disk rotatable with and slidable lengthwise of said casing; means outside of said casing and connected to one of said metal disks for imparting reciprocatory motion thereto; and a plurality of connectors disposed in peripheral notches in said metal disks and movable relatively thereto, said connectors having oppositely disposed projections adapted in their movement in either direction to coact with said metal disks at predetermined times.

6. A clutch casing; a driving shaft to which said casing is fixedly secured; a driven shaft; a block fixedly secured to said driven shaft; friction disks rotatable with and slidable lengthwise of said block; metal disks rotatable with and slidable lengthwise of said casing and adapted to coact with the friction disks; mechanism slidably mounted upon said driving shaft for forcing said disks into frictional contact; and connectors set into the peripheries of said metal disks for positively disconnecting said metal disks successively from said friction disks, said connectors having lateral oppositely disposed projections adapted to engage said metal disks in the movement of said connectors in either direction.

7. A clutch casing; a driving shaft therefor; a driven shaft; a block secured to said driven shaft; friction disks rotatable with and slidable lengthwise of said block; metal disks rotatable with and slidable lengthwise of said casing and adapted to coact with the friction disks; mechanism for forcing said disks into frictional contact; and two series of connectors set into the peripheries of said metal disks; one series making connection between the central disk and the disks on one side thereof and the other series making connection between said central disk and the disks on the other side thereof.

Signed by me at Waterville, Maine, this 25th day of February, 1926.

SAMUEL W. LOMBARD.